(12) United States Patent
Malpani et al.

(10) Patent No.: US 7,788,258 B1
(45) Date of Patent: Aug. 31, 2010

(54) AUTOMATIC DETERMINATION OF WHETHER A DOCUMENT INCLUDES AN IMAGE GALLERY

(75) Inventors: Radhika Malpani, Palo Alto, CA (US); Cheng Yang, Foster City, CA (US); Yonatan Zunger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 620 days.

(21) Appl. No.: 10/871,030

(22) Filed: Jun. 21, 2004

(51) Int. Cl.
*G06F 7/00* (2006.01)
*G06F 17/30* (2006.01)

(52) U.S. Cl. ........................ 707/724; 707/706
(58) Field of Classification Search .................. None
See application file for complete search history.

(56) References Cited

U.S. PATENT DOCUMENTS

| | | | |
|---|---|---|---|
| 5,513,277 A * | 4/1996 | Huttenlocher | 382/171 |
| 5,751,286 A * | 5/1998 | Barber et al. | 715/835 |
| 5,983,237 A * | 11/1999 | Jain et al. | 707/104.1 |
| 6,035,323 A * | 3/2000 | Narayen et al. | 709/201 |
| 6,121,963 A * | 9/2000 | Ange | 715/202 |
| 6,240,423 B1 * | 5/2001 | Hirata | 707/104.1 |
| 6,415,282 B1 * | 7/2002 | Mukherjea et al. | 707/3 |
| 6,463,426 B1 * | 10/2002 | Lipson et al. | 707/3 |
| 2002/0095439 A1 * | 7/2002 | Long et al. | 707/507 |
| 2003/0018631 A1 * | 1/2003 | Lipson et al. | 707/3 |
| 2003/0039410 A1 * | 2/2003 | Beeman et al. | 382/305 |
| 2004/0250205 A1 * | 12/2004 | Conning | 715/517 |
| 2005/0004897 A1 * | 1/2005 | Lipson et al. | 707/3 |
| 2005/0149473 A1 * | 7/2005 | Weare | 707/1 |
| 2006/0190445 A1 * | 8/2006 | Risberg et al. | 707/3 |
| 2007/0269139 A1 * | 11/2007 | Erol et al. | 382/305 |

OTHER PUBLICATIONS

Petrakis et al, "ImageMap: An Image Indexing Method Based on Spatial Similarity", Sep./Oct. 2002, IEEE Transactions and Knowledge and Data Engineering, vol. 14, pp. 979-987.*

* cited by examiner

*Primary Examiner*—Apu M Mofiz
*Assistant Examiner*—Jared M Bibbee
(74) *Attorney, Agent, or Firm*—Harrity & Harrity, LLP

(57) ABSTRACT

Image galleries are automatically located within documents, such as web pages. Documents that are determined to contain image galleries may be treated differently when storing the document for later retrieval by an image search engine. In one implementation, the image galleries are automatically located within a document by calculating position information indicating relative positions of images in the document. The document may be determined to contain an image gallery when the position information indicates that the images in the document are generally evenly distributed.

29 Claims, 14 Drawing Sheets

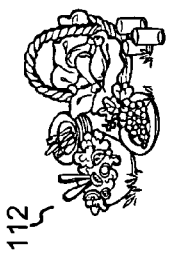
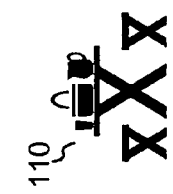
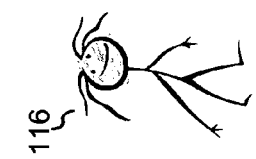
My Family Picnic
September 20, 2002
111 — A picture of all the food.
113 — My father, Bill Smith.
115 — Ernest Smith, 10 months old.
117 — Bill Smith, Rita Smith, and daughter.
130 — Buy Shoes Online! Click Here!
FIG. 1

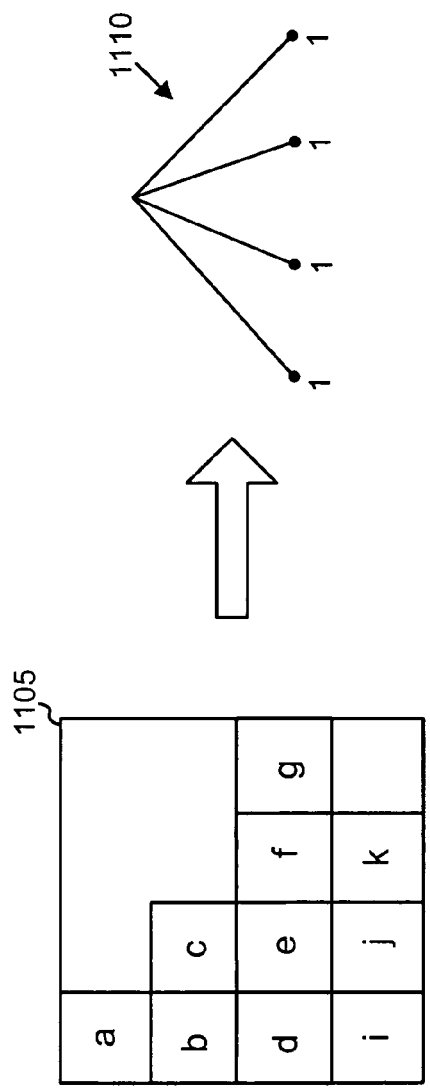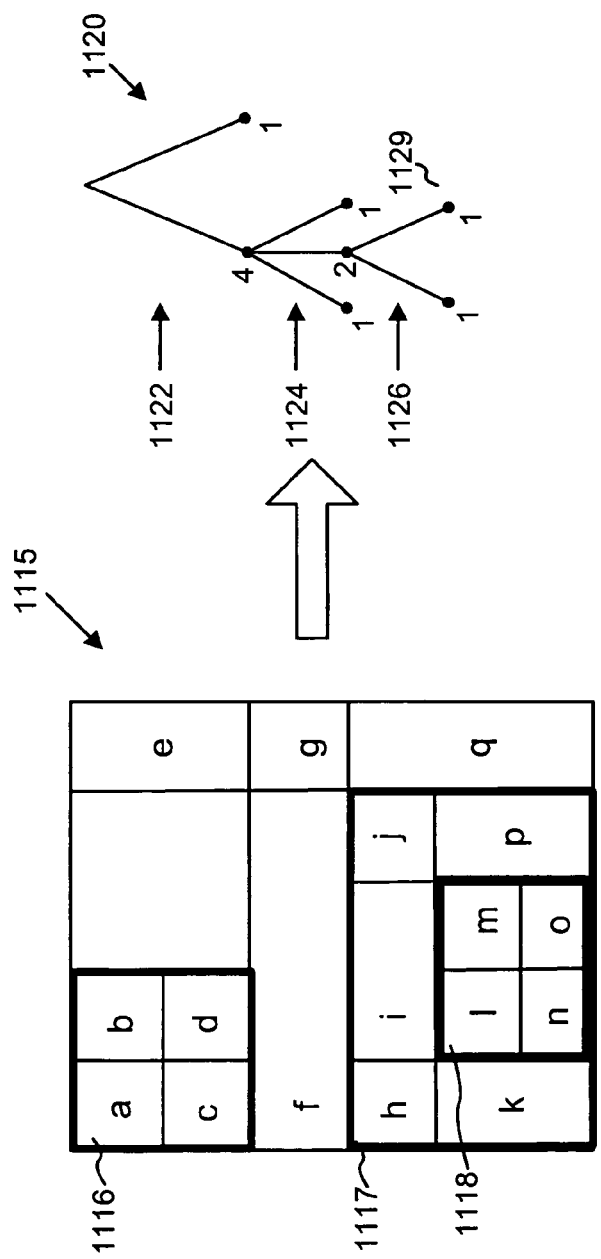

| (1, 8) <img> | (3, 8) | (4, 8) <img> | | | | | | | |
|---|---|---|---|---|---|---|---|---|---|
| | | (4, 7) | (5, 7) | | | | | | |
| | | | (5, 6) | (6, 6) <img> | (7, 6) | (8, 6) | (9, 6) <img> | (10, 6) | (11, 6) | (12, 6) <img> |
| | | | (5, 5) | (6, 5) | (7, 5) | (8, 5) | (9, 5) | (10, 5) | (11, 5) | (12, 5) |
| | | | (5, 4) | (6, 4) <img> | (7, 4) | (8, 4) | (9, 4) <img> | (10, 4) | (11, 4) | (12, 4) <img> |
| | | | (5, 3) | (6, 3) | (7, 3) | (8, 3) | (9, 3) | (10, 3) | (11, 3) | (12, 3) |
| (1, 2) <img> | (2, 2) | | (4, 2) <img> | (5, 2) | (6, 2) <img> | (7, 2) | (8, 2) | (9, 2) <img> | (10, 2) | (11, 2) | (12, 2) <img> |
| (1, 1) | (2, 1) <img> | (3, 1) | (4, 1) | (5, 1) | | | | | | |

| h﹨y | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 0 | 0 | 4 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 1 | 1 | 0 | 0 | 0 | 0 | 0 | 0 | 0 | 0 |
| 7 | 0 | 0 | 0 | 0 | 0 | 0 | 0 | 0 | 0 | 0 | 0 |

FIG. 15

AUTOMATIC DETERMINATION OF WHETHER A DOCUMENT INCLUDES AN IMAGE GALLERY

BACKGROUND OF THE INVENTION

A. Field of the Invention

Systems and methods described herein relate generally to information retrieval and, more particularly, to automated techniques for classifying documents.

B. Description of Related Art

The World Wide Web ("web") contains a vast amount of information. Search engines assist users in locating desired portions of this information by cataloging web pages. Typically, in response to a user's request, the search engine returns references to documents relevant to the request.

One type of search engine is an image search engine. An image search engine, such as a web-based image search engine, catalogs images from the web. Typically, the image search engine may associate text, such as text that occurs near a particular image, with the image. The text associated with an image may then be searched using conventional key-word based search queries to locate images relevant to the search query.

Some documents contain images arranged in a format known as an "image gallery." Image galleries include multiple images arranged in some uniform manner. For example, a web-based hyper text markup language (HTML) document describing a neighborhood picnic may contain nine images of the picnic arranged in a three by three table. Each image may include a description of the image (e.g., a description of the people in the image) located visually near the image.

Image search engines may consider images belonging to image galleries to be of different quality than other images, and may thus treat them differently when returning results to users. Accordingly, it can be important for an image search engine to be able to recognize when an image is part of an image gallery.

SUMMARY OF THE INVENTION

According to one aspect, a method determines whether a document contains an image gallery by calculating position information indicating relative positions of images in the document. The method determines that the document contains an image gallery when the position information indicates that the images in the document are generally evenly distributed.

In another aspect, an image search engine includes a search component configured to return images relevant to search queries based on a comparison of the search query to a document index. The image search engine further includes an image indexing component configured to generate the document index based on text in documents that contain images. The image indexing component annotates the document index to indicate when documents in the document index include an image gallery.

In yet another aspect, a method indexes a document for use by a search engine. The method includes determining whether a document contains an image gallery based on a spatial layout of images in the document. The method further includes indexing the document in a manner based on whether the document contains an image gallery.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 diagram illustrating an exemplary web document containing an image gallery;

FIG. 6 is a diagram illustrating an exemplary token table of three rows and four columns;

FIG. 7 is a diagram illustrating a second exemplary token table;

FIG. 8 is a diagram illustrating a third exemplary token table;

FIG. 9 is a diagram illustrating an exemplary nested token table and its corresponding coordinates;

FIGS. 11A and 11B are diagrams illustrating column trees formed for exemplary table structures;

FIG. 12 is a diagram of an exemplary token table in which image tokens are generally evenly spaced;

FIG. 13 is a diagram of an exemplary token table in which image tokens are not evenly spaced;

FIG. 15 is a diagram illustrating an exemplary histogram generated by the image indexing component.

DETAILED DESCRIPTION

The following detailed description of the invention refers to the accompanying drawings. The detailed description does not limit the invention.

Overview

As described herein, an image search engine automatically determines the likelihood of whether a document, such as an HTML web page, contains an image gallery. An image gallery is generally defined as multiple images arranged in some uniform manner in a document. The determination is based on the relative visual positions of images in the document and, in particular, whether multiple images in a document are evenly distributed. Other factors, such as image resolution, the amount of non-image content between images, whether an image points to another image or page, or the size of the image, may also be taken into consideration when determining the likelihood that a document contains an image gallery.

FIG. 1 is a diagram illustrating an exemplary web document containing an image gallery 100. More specifically, image gallery 100 includes images 110, 112, 114, 116, 118, and 120. Some of these images include captions, such as captions 111, 113, 115, and 117. Image 130 is not part of image gallery 100. When the image search engine indexes this document, it would be desirable to recognize that this document includes an image gallery and the images that are part of image gallery 100. One way of doing this, as described herein, is based on the fact that images 110, 112, 114, 116, 118, and 120 are generally distributed in a uniform manner relative to one another.

Exemplary Network Overview

Figure 2:
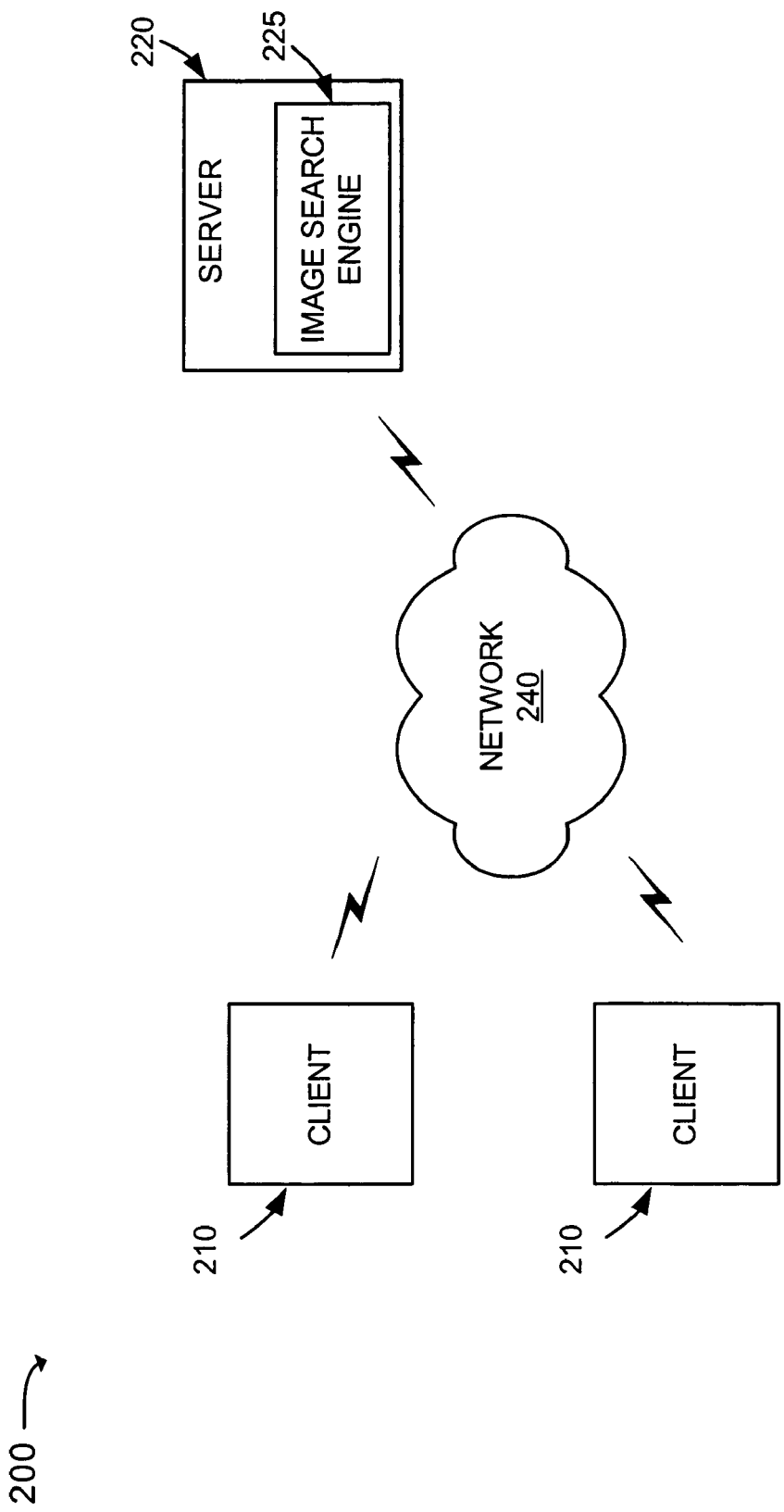
FIG. 2 is an exemplary diagram of a network in which concepts consistent with the principles of the invention may be implemented.

FIG. 2 is an exemplary diagram of a network 200 in which concepts consistent with the principles of the invention may be implemented. Network 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images in a manner consistent with the principles of the invention. Clients 210 and server 220 may connect to network 240 via wired, wireless, or optical connections.

Server 220 may include an image search engine 225 usable by clients 210. In general, in response to a client request, image search engine 225 may return images to the client that are relevant to the client requests.

A document, as the term is used herein, is to be broadly interpreted to include any machine-readable and machine-storable work product. A document may be an e-mail, a blog, a file, a combination of files, one or more files with embedded links to other files, a news group posting, etc. In the context of the Internet, a common document is a web page, such as an HTML web page. Web pages often include content and may include embedded information (such as meta information, hyperlinks, etc.) and/or embedded instructions (such as Javascript, etc.). Documents discussed herein generally include embedded images. A "link" as the term is used herein is to be broadly interpreted to include any reference to/from a document from/to another document or another part of the same document.

Exemplary Client/Server Architecture

Figure 3:
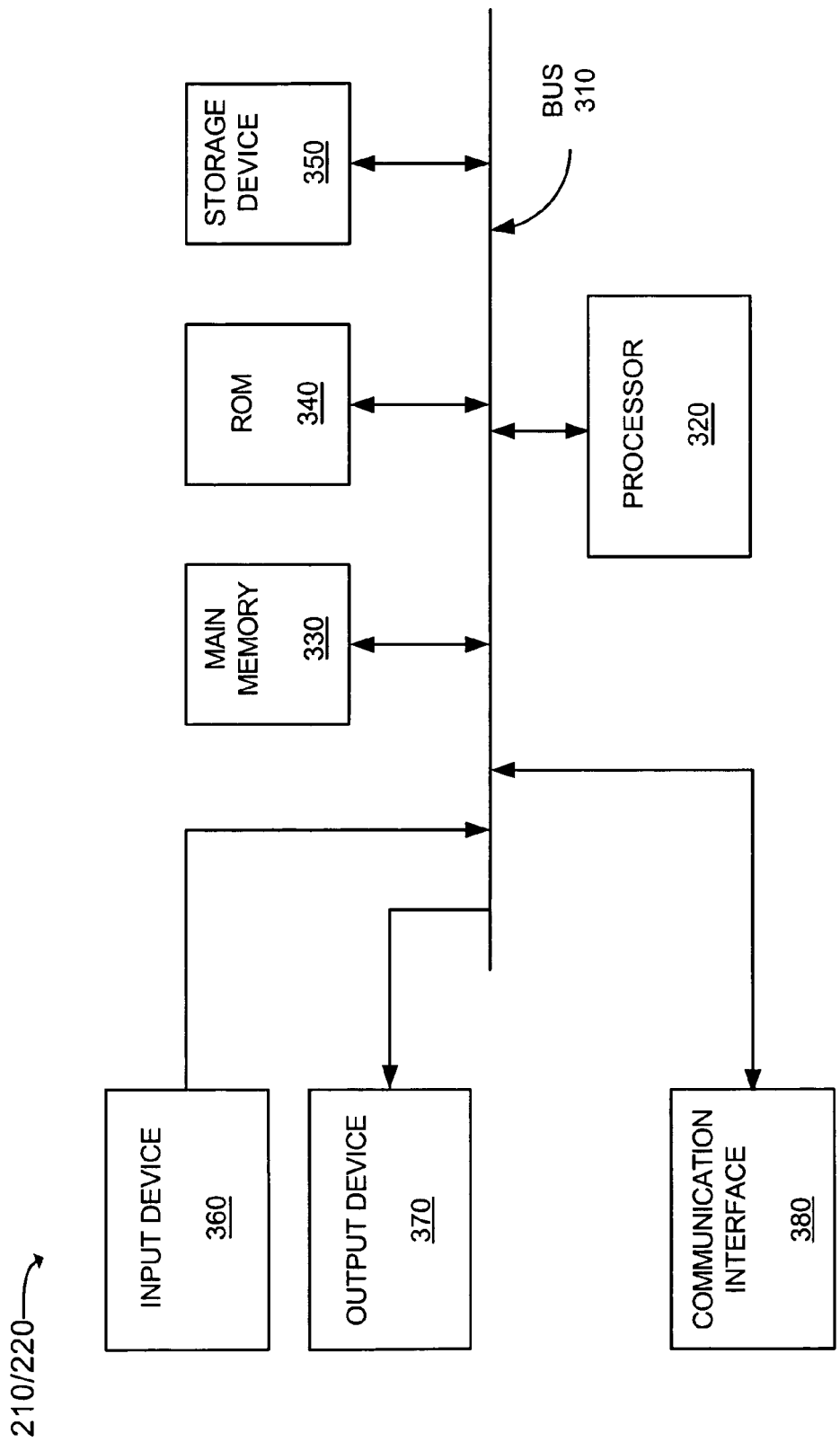
FIG. 3 is an exemplary diagram of a client or server shown in the network of FIG. 2.

FIG. 3 is an exemplary diagram of a client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include conventional processors, microprocessors, or processing logic that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to client/server 210/220, such as a keyboard, a mouse, a pen, voice recognition and/or biometric mechanisms, etc. Output device 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220, consistent with the principles of the invention, may implement image search engine 225. Image search engine 225 may be stored in a computer-readable medium, such as memory 330. A computer-readable medium may be defined as one or more physical or logical memory devices and/or carrier waves.

The software instructions defining image search engine 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Image Search Engine 225

Figure 4:
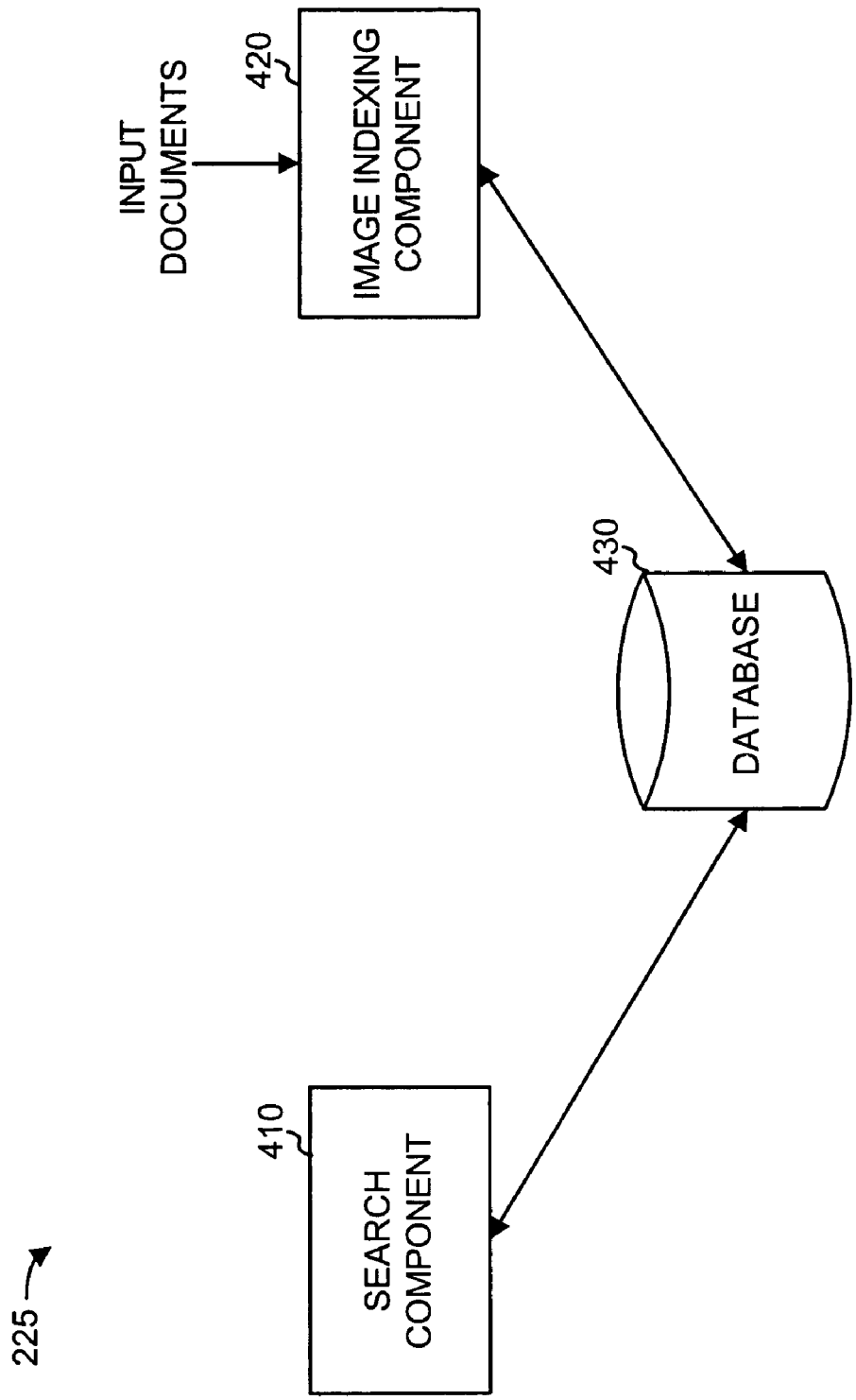
FIG. 4 is a block diagram illustrating an exemplary implementation of the image search engine shown in FIG. 2.

FIG. 4 is a block diagram illustrating an implementation of image search engine 225. Image search engine 225 may include a search component 410, an image indexing component 420, and a database 430. In general, image indexing component 420 may receive input documents, such as HTML web pages retrieved from the web, and parse the input documents for text and images that are to be included in potential results of search engine 225. In one implementation, image indexing component 420 may store images and image descriptive text in database 430. Other information, such as ranking values that attempt to describe the quality or importance of particular images or descriptive text may also be stored in database 430. Images that are determined to be a part of an image gallery may be given a different ranking value than non-image gallery images. Additionally, the uniform resource locator (URL) for a source web document that contains an image may also be stored in database 430.

Database 430 generally stores a collection of data. Database 430 may be implemented as, for example, a relational or non-relational database capable of storing and accessing data. Database 430 may be implemented on a single computing device or distributed across many computing devices and/or storage devices.

Search component 410 may receive user search queries, such as from clients 210, search database 430 for results based on the search queries, and return relevant results (i.e., images) to the user. Search component 410 may generally match terms in a search query to terms in database 430 that describe images. Images associated with descriptive text that includes the search terms are considered "hits" and may be returned to the user. Search component 410 may additionally attempt to rank the returned hits so that the most relevant and/or highest quality images are returned to the user. Techniques for implementing search query based search engines are known in the art and will not be described further herein.

One of ordinary skill in the art will recognize that although image search engine 225 is illustrated as containing search component 410, image indexing component 420, and database 430, these elements may be physically implemented on different computing devices and may only be loosely coupled to one another. In some implementations, image indexing component 430 may be thought of as being essentially separate from the search component portion of search engine 225, in which image indexing component receives and processes input documents independently of search component 410.

Operation of Image Indexing Component 420

Figure 5:
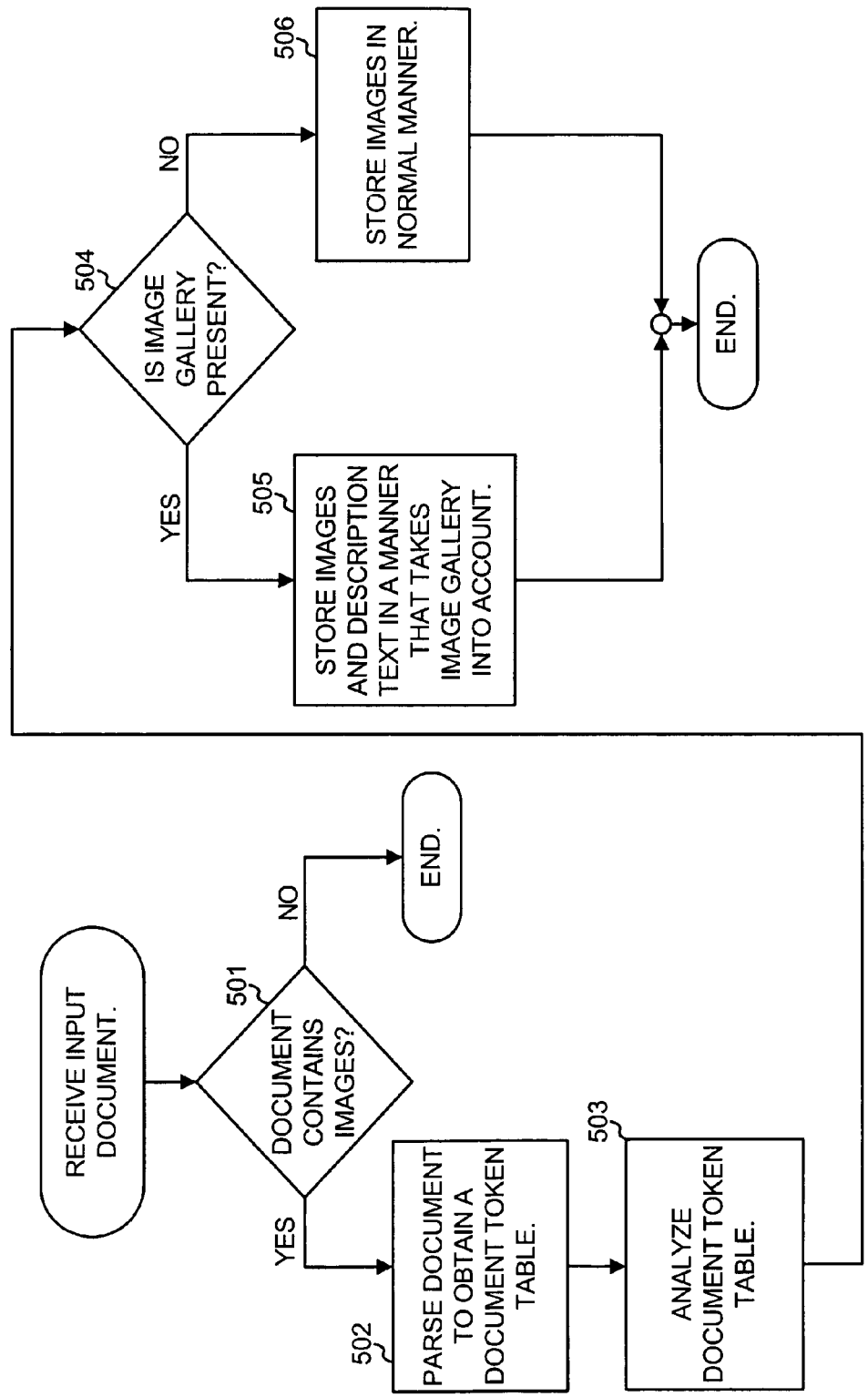
FIG. 5 is a flow chart illustrating exemplary operations of the image indexing component in response to receiving a document.

FIG. 5 is a flow chart illustrating exemplary operations of image indexing component 420 in response to receiving a document, such as an input web page crawled from the web. Image indexing component 420 may initially analyze the document to determine if it contains images (act 501). If it does not, the document is not a candidate for image indexing. Assuming images are present, image indexing component 420 may parse the input document to obtain one or more document token tables (act 502). Document token tables, described in more detail below, represent the logical spatial layout of the component parts of the document. The document token table may be analyzed to determine the likelihood that an image gallery is present in the document (acts 503 and 504). If an image gallery is present, the images from the document may be stored in database 430 in a manner that takes into account the presence of the image gallery (act 505). For example, as previously mentioned, images contained within the image gallery may be annotated in database 430 as being part of an image gallery and given a different ranking scores. If an image gallery is determined to not be present, the images from the document may be stored in database 430 in the normal manner (act 506).

The token table generated in act 502 may generally be used to describe the spatial layout of the document. For HTML documents, entries in the table are tokens defined by HTML tags. In particular, tokens may include image tokens and textual tokens. Image tokens may refer to images embedded in the document, such as images embedded with the HTML "<img>" tag. The HTML code, "<img src=http://news.google.com/images/news.gif width=205 height=85>", for example, embeds the image "news.gif," which has a width of 205 pixels and a height of 85 pixels, into a document. Textual tokens may include text delineated by HTML tags such as <hr> (horizontal rule), <p> (paragraph break), and <br> (line break).

Figures 6, 7:
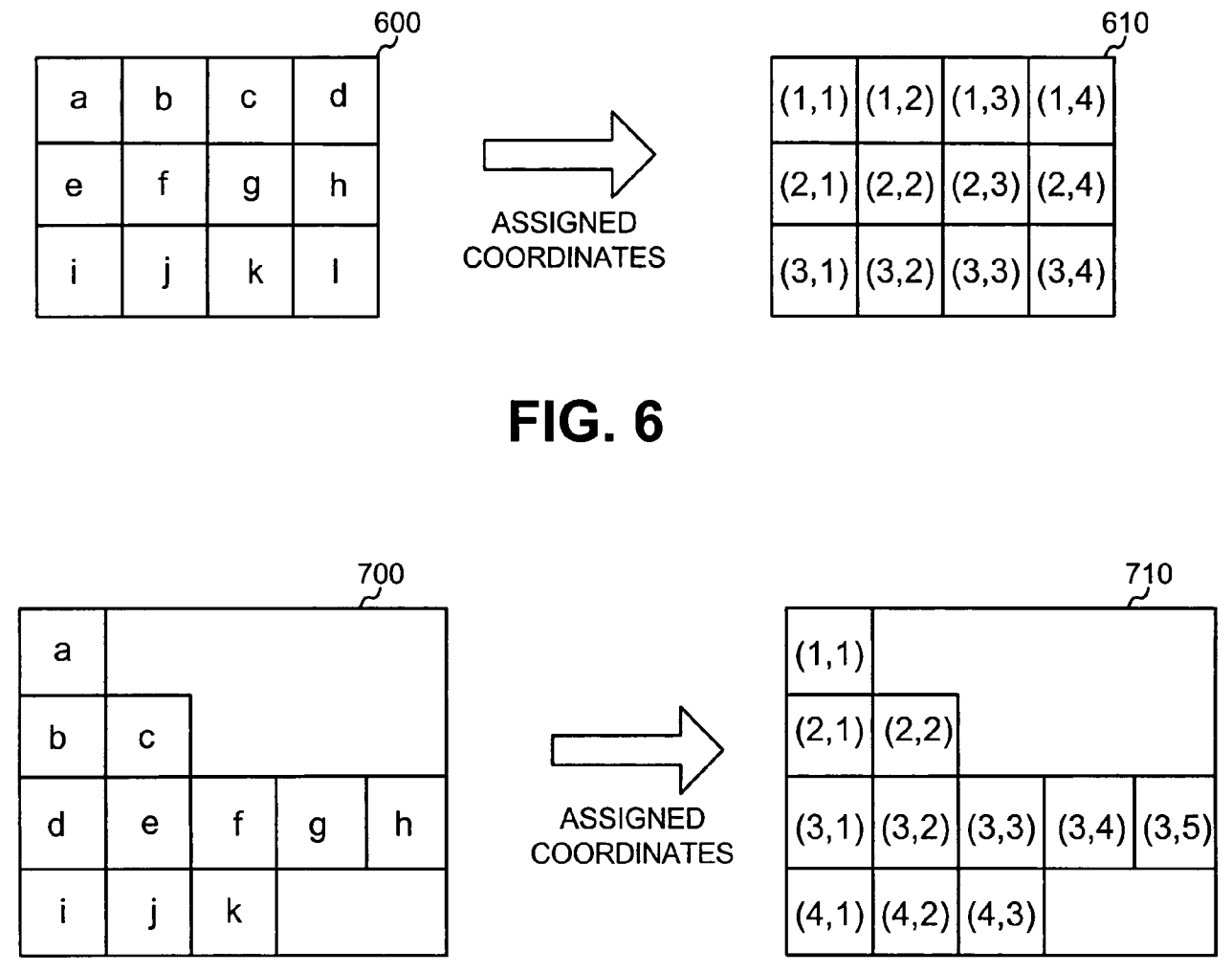

The tokens from a document may be used to create token tables in which the coordinates of the cells in the table define a spatial layout of the document. Each token in the document can be assigned two values, such as first and second integer values that define the row and column coordinates of the token in the token table. In one implementation, coordinates are assigned at the granularity of table cells. FIG. 6 is a diagram illustrating a token table 600 of three rows and four columns. Token table 600 may represent a document containing twelve tokens labeled as tokens "a" through "l", such as twelve images and/or text sections, defined in an HTML table having three rows and four columns. The coordinates assigned to each cell are shown in table 610.

Figures 8, 9:
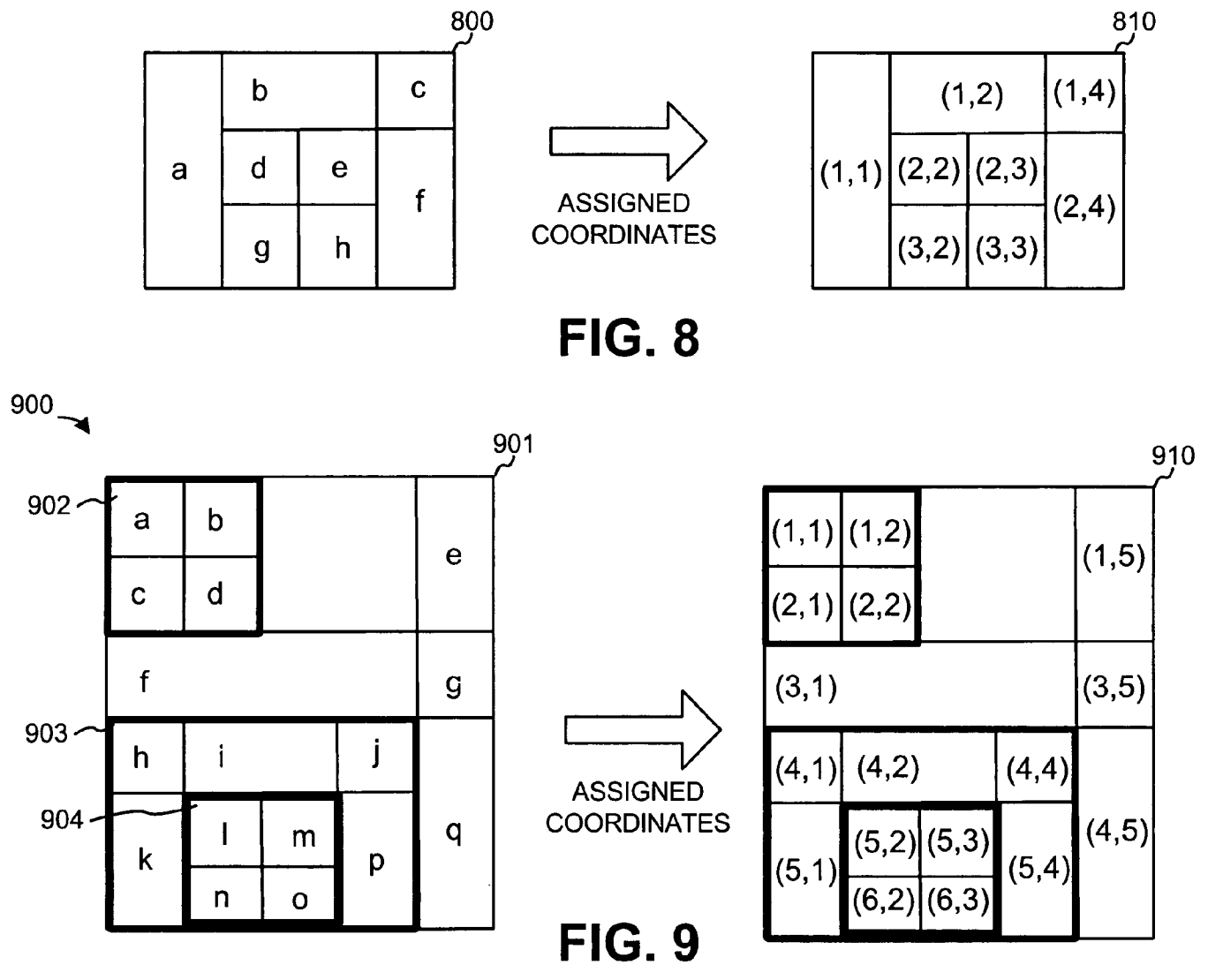

FIG. 7 is a diagram illustrating a second exemplary token table 700 and its assigned coordinates 710. Token table 700 includes tokens "a" through "k." As token table 700 illustrates, different rows are not required to have an equal number of columns. Additionally, cells in a token table may span multiple rows and/or columns. This situation is illustrated in FIG. 8, in which a token table 800 includes three cells ("a," "b," and "f") each spanning multiple rows or columns. In particular, token "a" spans three rows, token "b" spans two columns, and token "f" spans two rows. Even through a token spans multiple rows/columns, it may be assigned a single coordinate value, such as a coordinate value corresponding to the unit cell in the upper-left corner. This is illustrated in the coordinate table 810 corresponding to token table 800. As shown, token "a" is assigned the coordinate values (1,1), token "b" is assigned the coordinate values (1,2), and token "f" is assigned the coordinate values (2,4).

Certain HTML structures, such as HTML tables, may be nested. In the case of a nested table, a single cell of a table may itself contain a table. The nested table may include multiple tokens or even additional tables. FIG. 9 is a diagram illustrating an exemplary nested token table 900 and its corresponding coordinates 910. The underlying HTML document includes four tables that define token table 900. The highest level table is the three by two table 901 that defines six cells. Four of the cells include the single tokens "e," "f," "g," and "q." The upper-left cell includes a two by two nested table 902 that includes the four tokens "a" through "d." The bottom-left cell of table 901 includes a two by three nested table 903 that includes the tokens "h" through "k" and "p." Nested table 903 additionally includes a second level two by two nested table 904 that includes the tokens "l" through "o." Coordinates are assigned to tokens "a" through "q" as shown in coordinate table 910. As shown, in the case of nested tables, the coordinates for the nested tables may be assigned on the basis of a "flattened" table model, in which certain cells span multiple rows or columns in the flattened table model. In the example shown in FIG. 9, the minimum coordinate granularity is defined by the lowest level nested table 904. The final coordinate space includes the row range one through six and the column range one through five.

HTML tokens that are not contained within a table structure, such as a block of text outside of tables, may be considered to be within a table of one column and n rows, where each row includes up to a predetermined number of tokens (e.g., 128 tokens). HTML text delineator tags, such as <br>, <p>, and <hr> may additionally be used to delineate rows.

The exemplary token tables shown in FIGS. 6-9 provide a representation of the visual layout of tokens in a document. The table coordinates do not necessarily represent the exact locations of tokens in Euclidean space, but instead represent "logical" spatial distances in the document. In particular, in one implementation, the "width" attribute of table cells may be ignored when assigning coordinates.

Figure 10:
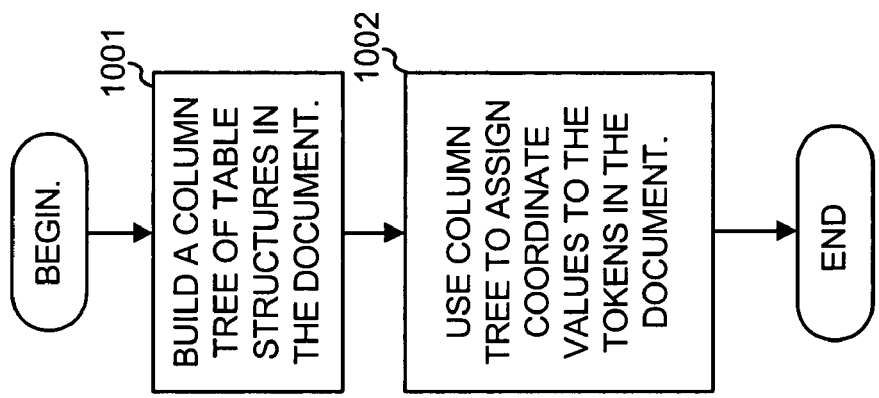
FIG. 10 is a flow chart illustrating exemplary operations for creating a token table.

FIG. 10 is a flow chart illustrating creating a token table, as performed in act 502, in additional detail. The token table may be created using a two pass process over tables in the document. For an HTML document, the HTML source code may be examined.

The first pass over the document may be used to build a column tree of the table structures in the document (act 1001). FIGS. 11A and 11B illustrate two column trees formed for two exemplary table structures. Column tree 1110 includes four branches, one for each of the columns in its corresponding table 1105. Column tree 1120 includes nested sets of branches corresponding to the nested tables in its corresponding table structure 1115. More specifically, column tree 1120 includes: a first level 1122 of two branches corresponding to the two primary columns in table 1115; a second level 124 of three branches corresponding to the two nested tables 1116 and 1117, which together define a maximum of three columns; and a third level 1126 of two branches corresponding to table 1118, which is nested within the second column of table 1117. The numbers on the nodes of column trees 1110 and 1120 indicate the total number of leaf nodes in each subtree, which is equal to the total number of logical columns in the nested table.

The column tree for a document may be used during a second pass of the document to assist in assigning the coordinate values to the tokens in the document (act 1002). In particular, when assigning a column coordinate value to a particular token, image indexing component 420 may locate the node position on the column tree that corresponds to the token. The column coordinate value can then be determined based on the number of leaf nodes in the column tree to the left of the node. For example, the node corresponding to token "m" can be traced to node 1129 as being the second column in the second level nested table 1126, which itself is a table nested in the second column of nested table 1124, which is the first column in table 1122. There are two leaf nodes to the left of this node, so the column coordinate value for token "m" is three.

As previously mentioned, the token tables created in act 502 (FIG. 5) may be used when analyzing a document to determine whether an image gallery is present in the document (acts 503 and 504). Image indexing component 420 may analyze image tokens in a token table and determine whether the image tokens are "evenly distributed." If so, the document corresponding to the token table may be classified as an image gallery.

FIG. 12 is a diagram of an exemplary token table 1210 in which the image tokens are generally evenly distributed. As shown, token table 1210 includes possible row coordinates one through twelve and possible column coordinates one through eight. Image tokens are denoted with the "<img>" tag. The image tokens at coordinates (6,2), (6,4), (6,6), (9,2), (9,4), (9,6), (12,2), (12,4), and (12,6) are evenly distributed as they are two cells apart horizontally and three cells apart vertically. This document may be considered to be an image gallery.

Figure 13:
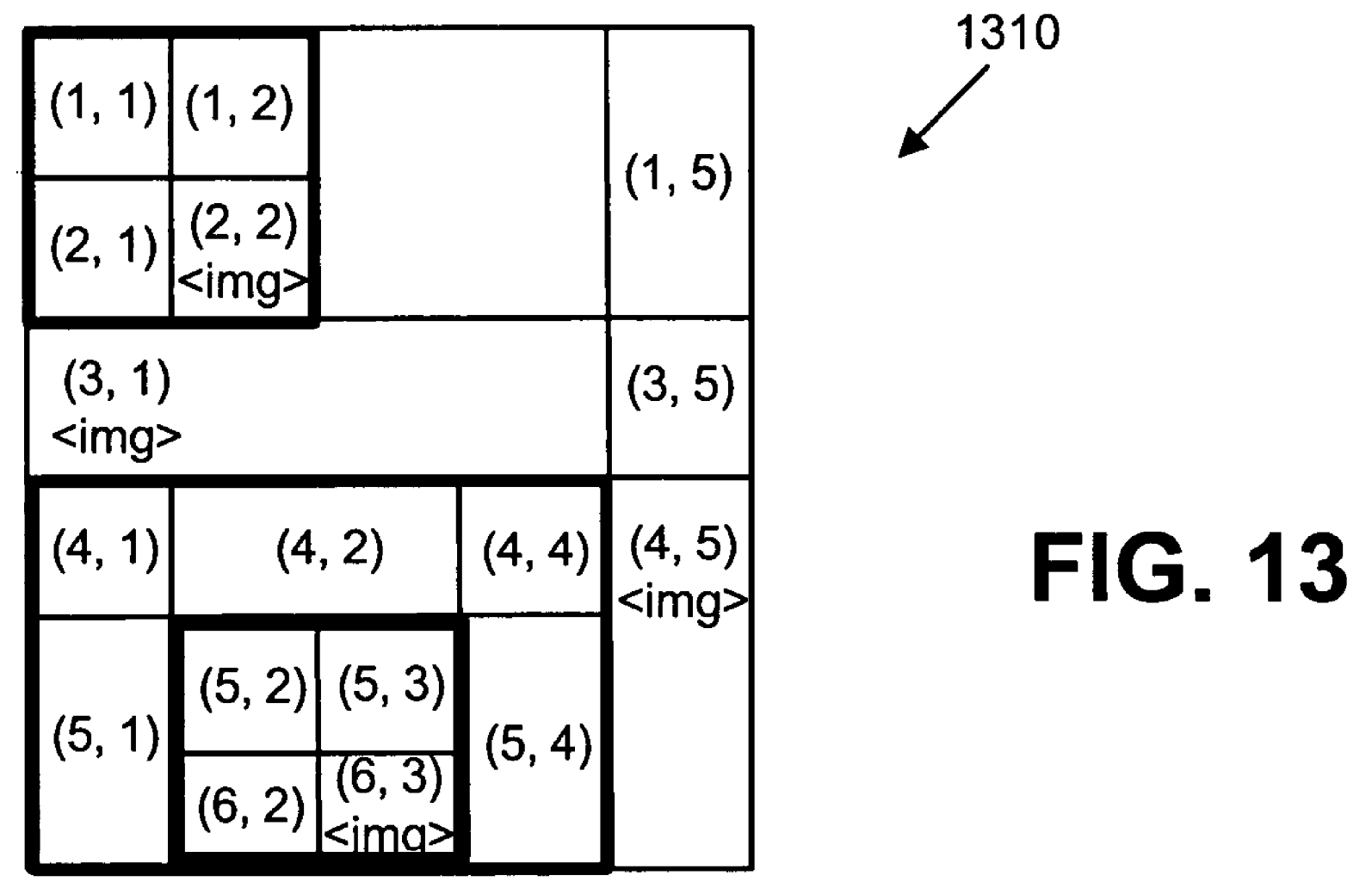

FIG. 13 is a diagram of an exemplary token table 1310 in which the image tokens are not evenly spaced. There is no group of images in this token table that are evenly distributed, accordingly this document would be classified as not an image gallery.

Figure 14:
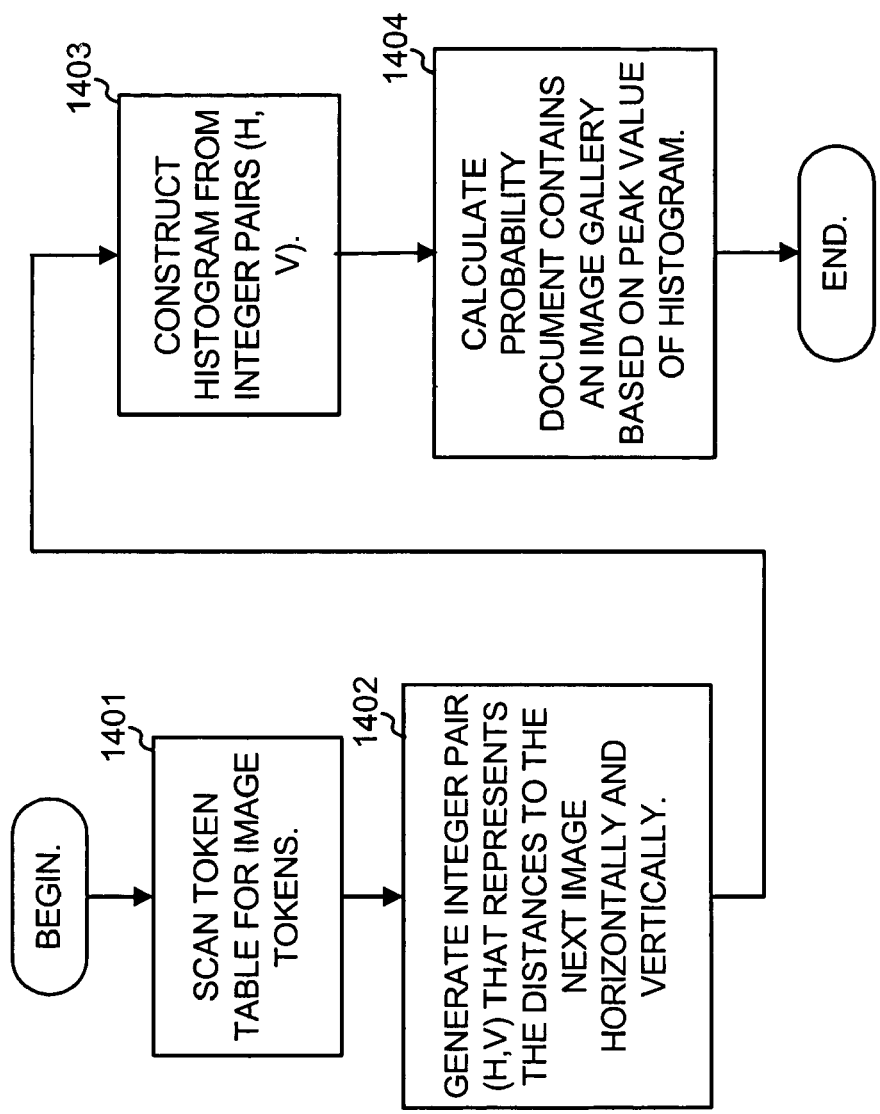
FIG. 14 is a flow chart illustrating exemplary operations for detecting whether an image gallery is present in a document based on whether image tokens in the document are evenly distributed.

FIG. 14 is a flow chart illustrating exemplary operations for detecting whether an image gallery is present in a document based on whether image tokens in the document are evenly distributed. Processing may begin by scanning the token table for image tokens (act 1401). For each image token, an integer pair ($h_i$, $v_i$) may be generated that represents the distances to the next image horizontally (h) and the next image vertically (v) to the image token (act 1402). For token table 1210, for instance, six image tokens have such pairs. The image token at coordinate (1,2) has a next image horizontally at coordinate (1, 8) and a next image vertically at coordinate (4, 2). The integer pair for this token is thus (h=6, v=3) because the next image horizontally is at (1, 2+6) and the next image vertically is at (1+3, 2). Similarly, the image token at coordinate (4, 2) has an integer pair (h=6, v=2), corresponding to the image tokens at coordinates (4, 8) and (6, 2). Further, the image tokens at coordinates (6, 2), (6, 4), (9, 2), and (9, 4) each have integer pairs (h=2, v=3). A number of the image tokens in token table 1210 (i.e., the tokens at coordinates (2, 1), (1, 8), (9, 2), (9, 6), (12, 2), (12, 4), and (12, 6)) do not have corresponding (h, v) integer pairs, as there are no two next image tokens that are in the same horizontal row and the same vertical column, respectively, as these image tokens.

Image indexing component 420 may next construct a two-dimensional histogram from the (h, v) integer pairs (act 1403). An exemplary histogram for token table 1210 is illustrated in FIG. 15 as histogram 1510. Histogram 1510 includes a peak value of four at (h=2, v=3), which corresponds to the four image tokens at coordinates (6, 2), (6, 4), (9, 2), and (9, 4). Image indexing component 420 may estimate the probability that the document contains an image gallery based on the peak value of the histogram (act 1404). Higher peak values tend to increase the likelihood that a document is an image gallery. In one implementation, the likelihood may be estimated as:

$$1-e^{-p/3},$$

where p is the histogram peak value (e.g., p=4 for histogram 1510). Factors other than the histogram peak value may be taken into account in act 1404. For example, whether images include links to other images or web documents may be taken into consideration. Additionally, the size of the images may be taken into consideration.

One of ordinary skill in the art will recognize that a number of modifications can be made to the image gallery detection techniques described above. For example, certain image tokens may not be counted as contributing to histogram 1510. For instance, an image token may contribute to histogram 1510 only if it has an outgoing link (e.g., to other images of web documents) and/or only if the image size is within certain thresholds. Additionally, it may be desirable that image galleries include some non-image content between gallery images. To enforce this constraint, integer pairs (h=1, v=1) may be ignored.

Additionally, some web sites, or some types of web sites, may be types of sites that should generally not be considered to be image galleries. For example, it may be desirable to not include shopping sites into the image galleries. Accordingly, if a site is a shopping site, the corresponding document may be considered to not be an image gallery. One technique for detecting likely shopping sites is by looking for shopping related keywords, such as "$," "price," "order," "checkout," etc.

Additionally, if the image gallery portion of the document makes up only a small portion of the entire document, the document's gallery likelihood can be decreased. Also, the number of pages that belong to a particular web site, or the number (or portion) of pages at the site that have been determined to be image galleries, may also be taken into consideration.

In another possible implementation, rather than assigning integer coordinates to cells in the token table, real numbers could be used. For example, top-level tables could be assigned integer coordinates, first-level nested tables could be assigned fractional coordinates, second-level nested tables could be assigned finer fractional coordinates, etc.

In yet another application of the above described techniques, the token tables created in act 502 may be used for purposes other than image gallery detection. For example, the coordinates in the token tables could be used to determine a distance measurement from keywords to images. These distance measurements can be used as a basis for determining how related a keyword is to an image. As another example, the coordinates can be used to give an approximation of a web page's geometric layout, which may be used to assist in the analysis of page content.

Exemplary Image Search Results

Figure 16:
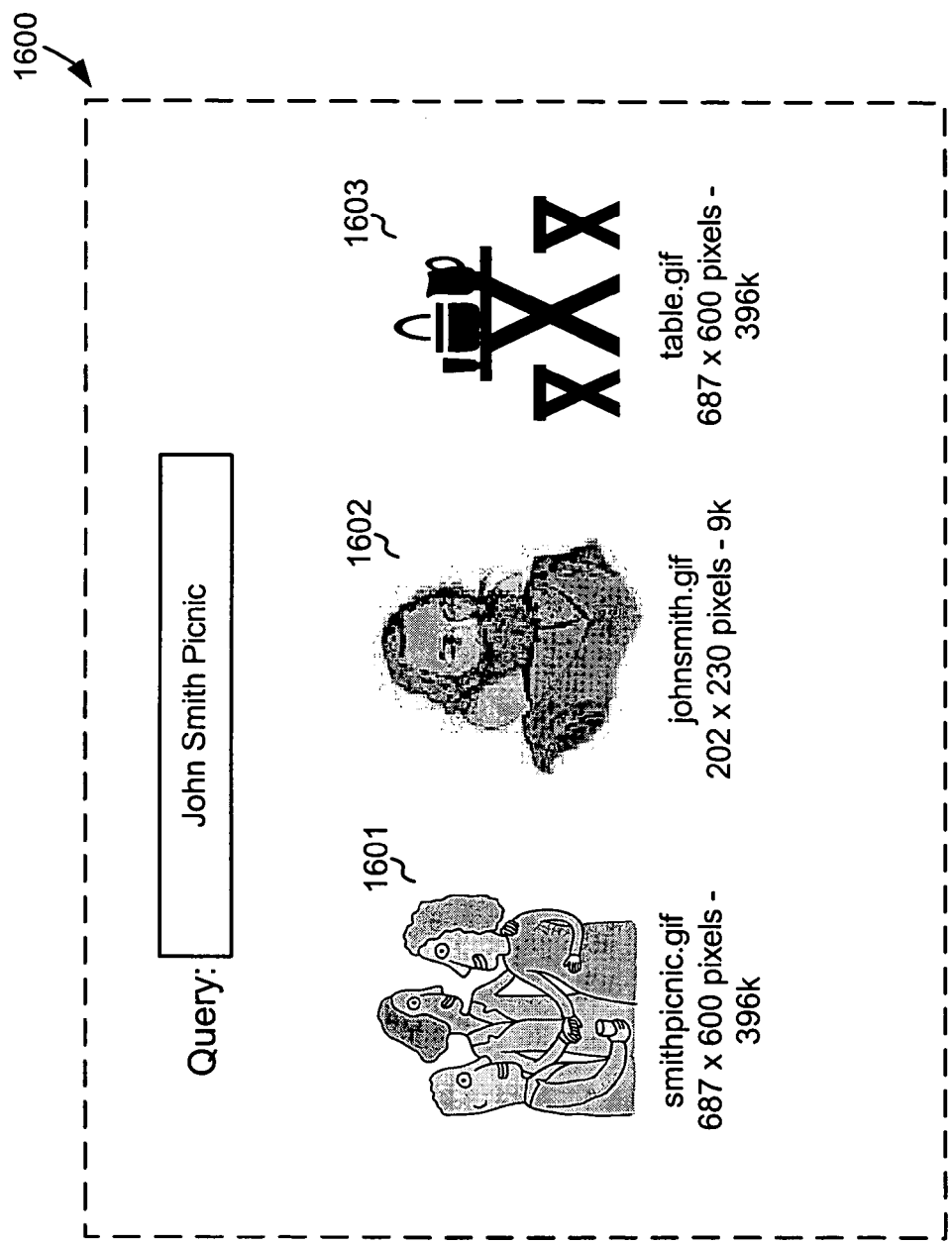
FIG. 16 is a diagram illustrating exemplary results of an image search.

FIG. 16 is a diagram illustrating exemplary results of an image search, such as an image search performed using search engine 225. Image search engine 225 may return a document 1600 in response to a search query, such as the exemplary search query "John Smith Picnic." Document 1600 may include a number of images 1601, 1602, and 1603. Images 1601, 1602, and 1603 may be thumbnail images that link to the source web document in which the images are located. Some of the images, such as images 1601 and 1602, may be images that image indexing component 420 determined to come from an image gallery.

CONCLUSION

Techniques for locating image galleries and documents that contain image galleries were described above. The image galleries may be located by looking for sets of images that are evenly distributed. In one implementation, whether images are evenly distributed is determined from a token table formed from the document.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results. Further, although many of the operations were primarily described in the context of HTML-based web documents, image galleries could be located in other types of documents.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A computer-implemented method comprising:
   identifying, by one or more processors, a document stored on a server in a network;
   calculating, by one or more processors, position information indicating relative positions of images in the document, the position information providing an indication of horizontal and vertical distances between the images in the document, the horizontal and vertical distances corresponding to spatial distances between the images when the document is rendered and displayed on a display;
   constructing, by one or more processors, a histogram based on the horizontal and vertical distances between the images in the document;
   calculating, by one or more processors, a likelihood that the document includes an image gallery based on a peak value in the histogram;
   indicating, by one or more processors, that the document contains an image gallery or does not contain an image gallery based on the calculated likelihood; and
   in response to an indication that the document contains an image gallery, updating, by one or more processors, an index, stored in a memory, that references the document or a score of the document.

2. The method of claim 1, where indicating that the document contains an image gallery or does not contain an image gallery is further based on links corresponding to images in the document or sizes of images in the document.

3. The method of claim 1, where the calculating the position information includes:
   locating tokens in the document; and
   generating a token table in which the located tokens are assigned to cells in the token table such that tokens in the token table are arranged to have a logical spatial layout in the token table corresponding to a spatial layout of the images in the document.

4. The method of claim 3, where tokens that are contained in nested tables within the document are assigned to the token table based on a flattened version of the tables within the document.

5. The method of claim 3, where the document is a hypertext markup language (HTML) document and the tokens include references to images using an HTML image tag.

6. The method of claim 5, where the tokens additionally include text delineated with paragraph header or line break HTML tags.

7. The method of claim 1, where the likelihood that the document includes an image gallery is calculated as $$1-e^{-p/3},$$

where p is the peak value in the histogram.

8. A device comprising:
   means for identifying a document stored on a server in a network;
   means for calculating position information indicating relative positions of images in the document, the position information providing an indication of spacing of the images in the document, the means for calculating including:
      means for constructing a histogram based on horizontal and vertical distances between the images in the document, the horizontal and vertical distances corresponding to spatial distances between the images when the document is rendered and displayed, and
      means for calculating a likelihood that the document includes an image gallery based on a peak value in the histogram;
   means for determining that the document contains an image gallery when the calculated position information indicates that the images are uniformly arranged relative to one another within the document;
   means for determining that the document does not contain an image gallery when the calculated position information indicates that the images are not uniformly arranged relative to one another in the document; and means for storing an indication that the document contains the image gallery when the document is determined to contain the image gallery.

9. The device of claim 8, where the means for calculating further includes:
   means for locating tokens in the document; and
   means for generating a token table based on a spatial layout of the located tokens.

10. The device of claim 9, where tokens that are contained in nested tables within the document are assigned to the token table based on a flattened version of the tables within the document.

11. An image search engine implemented in a computer device, comprising:
   a search component to return images relevant to search queries based on a comparison of a search query to a document index; and
   an image indexing component to store the document index based on text associated with images in documents, the image indexing component annotating the document index to indicate documents in the document index that include an image gallery, where the image indexing component is to automatically determine that a document includes an image gallery by analyzing the relative positions of images in the document to determine whether the images in the document are evenly spaced in the document with respect to one another, where the image indexing component is to automatically determine whether a document includes an image gallery by:
      constructing a two-dimensional histogram of occurrences of images based on horizontal and vertical image spacings from one another, the horizontal and vertical image spacings corresponding to spatial distances between the images when the document is rendered and displayed; and
      calculating a likelihood that the document includes an image gallery based on a peak value in the histogram.

12. An image search engine implemented in a computer device, comprising:
   a search component to return images relevant to search queries based on a comparison of the search query to a document index; and
   an image indexing component to store the document index based on text associated with images in documents, the image indexing component annotating the document index to indicate documents in the document index that include an image gallery, the image indexing component to automatically determine that a document includes an image gallery based on relative positions of images within the document, where the image indexing component determines the relative position of images in the document by:
      locating tokens in the document, the located tokens corresponding to the images in the document;
      generating a token table in which the located tokens are assigned to cells in the token table such that tokens in the token table are arranged to have a logical spatial layout in the token table corresponding to a spatial layout of the images in the document; and
      constructing a two-dimensional histogram based on horizontal and vertical distances between the located tokens in the document, the horizontal and vertical distances corresponding to spatial distances between the images when the document is rendered and displayed.

13. The image search engine of claim 12, where tokens that are contained in nested tables within the document are assigned to the token table based on a flattened version of the tables within the document.

14. A computer-implemented method comprising:
   calculating, by one or more processors, position information indicating relative positions of images in documents that are stored on at least one server in a network, the position information providing an indication of spacing of the images in the documents, the calculating including:
      constructing, by one or more processors, histograms based on horizontal and vertical distances between the images in the documents, the horizontal and vertical distances corresponding to spatial distances between the images when the documents are rendered and displayed on a display;
      calculating, by one or more processors, a likelihood that each document, of the documents, includes an image gallery based on a peak value in the histogram;
   determining, by one or more processors, that a first document of the documents contains an image gallery when the calculated position information indicates that the images are uniformly arranged relative to one another within the first document;
   determining, by one or more processors, that the first document does not contain an image gallery when the calculated position information indicates that the images are not uniformly arranged relative to one another within the first document;
   generating, by one or more processors, a document index based on text associated with the images in the first document, the document index being structured such that images that are arranged in image galleries are ranked differently than images that are not arranged in the image galleries;
   storing the generated document index in a memory; and
   returning, by one or more processors, images relevant to a search query based on a comparison of the search query to the document index.

15. A computer-implemented method comprising:
   crawling, by one or more processors, a network to identify documents stored on a server;
   determining, by one or more processors, that a document, that is identified, contains an image gallery based on a spatial layout of images in the document and links corresponding to images in the document or sizes of images in the document, where determining that the document contains an image gallery includes:
      constructing, by one or more processors, a histogram based on horizontal and vertical distances between images in the document, the horizontal and vertical distances corresponding to spatial distances between the images when the document is rendered and displayed, and
      calculating, by one or more processors, a likelihood that the document includes an image gallery based on a peak value in the histogram; and
   updating, by one or more processors, an index, in a memory and that includes the document, to indicate that the document contains an image gallery.

16. The method of claim 15, where determining that the document contains an image gallery based on the spatial layout of images in the document further includes:
   determining that the document contains an image gallery when the spatial layout of the images in the document indicates that the images are evenly distributed.

17. The method of claim 15, where the spatial layout of the images in the document are determined by:
   locating tokens in the document; and
   generating a token table based on a spatial layout of the located tokens, the token table representing the spatial layout of the images in the document.

18. The method of claim 17, where tokens that are contained in nested tables within the document are assigned to the token table based on a flattened version of the tables within the document.

19. The method of claim 17, where the document is a hypertext markup language (HTML) document and the tokens include references to images using an HTML image tag.

20. The method of claim 19, where the tokens additionally include text delineated with paragraph header or line break HTML tags.

21. The method of claim 15, where the likelihood that the document includes an image gallery is calculated as $$1-e^{-p/3},$$

where p is the peak value in the histogram.

22. A computer-implemented method comprising:
   identifying, by one or more processors, a document stored on a server in a network;
   locating, by one or more processors, tokens in the document, the tokens representing images in the document;
   generating, by one or more processors, a token table based on a spatial layout of the located tokens;
   calculating, by one or more processors, position information indicating relative positions of the images in the document based on the token table, the calculating including:
      constructing, by one or more processors, and using the token table, a histogram based on the horizontal and vertical distances between the tokens in the token table, the horizontal and vertical distances corresponding to spatial distances between the images when the document is rendered and displayed on a display;
   calculating, by one or more processors, a likelihood that the document includes an image gallery based on a peak value in the histogram;
   determining, by one or more processors, that the document contains an image gallery when the position information indicates that the images in the document are evenly spaced in the document with respect to one another;
   determining, by one or more processors, that the document does not contain an image gallery when the position information indicates that the images in the document are not evenly spaced in the document with respect to one another; and
   updating, by one or more processors, an index in a memory based on whether the document is determined to contain an image gallery.

23. The method of claim 22, where tokens that are contained in nested tables within the document are assigned to the token table based on a flattened version of the tables within the document.

24. The method of claim 23, where the tokens additionally include text delineated with paragraph header or line break HTML tags.

25. A computer-readable memory device including computer-executable instructions, the computer-readable memory device comprising:
   one or more instructions to identify a document stored on a server in a network;
   one or more instructions to calculate position information indicating relative positions of images in the document, the position information providing an indication of spacing of the images in the document, where the one or more instructions to calculate position information includes:
      one or more instructions to construct a histogram based on horizontal and vertical distances between the images in the document, the horizontal and vertical distances corresponding to spatial distances between the images when the document is rendered and displayed on a display, and
      one or more instructions to calculate, by the processor, a likelihood that the document includes an image gallery based on a peak value in the histogram;
   one or more instructions to determine that the document contains an image gallery when the calculated position information indicates that the images are uniformly arranged relative to one another within the document;
   one or more instructions to determine that the document does not contain an image gallery when the calculated position information indicates that the images are not uniformly arranged relative to one another within the document; and
   one or more instructions to, in response to a determination that the document contains an image gallery, update an index that references the document or a score of the document.

26. The computer-readable memory device of claim 25, where the one or more instructions to calculate the position information comprises:
   one or more instructions to locate tokens in the document; and
   one or more instructions to generate a token table in which the located tokens are assigned to cells in the token table such that tokens in the token table are arranged to have a logical spatial layout in the token table corresponding to a spatial layout of the images in the document.

27. The computer-readable memory device of claim 26, where tokens that are contained in nested tables within the document are assigned to the token table based on a flattened version of the tables within the document.

28. The image search engine of claim 11, where the likelihood that the document includes an image gallery is calculated as $$1-e^{-p/3},$$

where p is the peak value in the histogram.

29. The method of claim 14, where the likelihood that the first document includes an image gallery is calculated as $$1-e^{-p/3},$$

where p is the peak value in the histogram.

* * * * *